Nov. 16, 1937.                E. HUNTER                 2,099,364
       METHOD AND MEANS FOR REGISTERING PHOTOGRAPHIC REPRODUCTIONS
                    USED IN PROCESS OF COLOR PRINTING
                          Filed Feb. 21, 1936
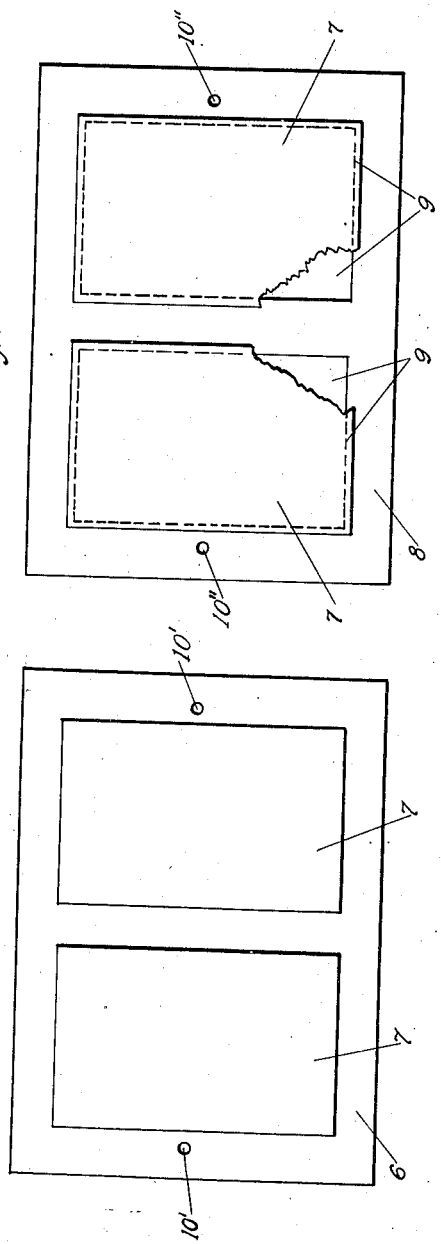
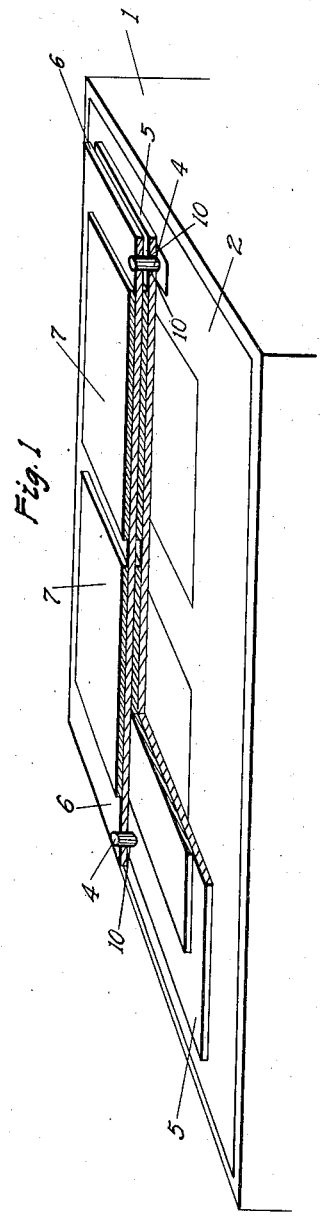
INVENTOR
Edward Hunter
BY Staley & Welch
ATTORNEYS Patented Nov. 16, 1937

2,099,364

UNITED STATES PATENT OFFICE 2,099,364

METHOD AND MEANS FOR REGISTERING PHOTOGRAPHIC REPRODUCTIONS USED IN PROCESS OF COLOR PRINTING

Edward Hunter, Springfield, Ohio

Application February 21, 1936, Serial No. 65,106

7 Claims. (Cl. 33—184.5)

This invention relates to a method and means for registering photographic reproductions used in connection with the preparation of the cylinders and plates of a printing press employed for color printing.

For printing in colors it is well known that when a picture or other illustration in colors is to be reproduced by printing, a series of photographic films or plates are made, one film or plate for each color, these photographic films or plates being mounted upon a suitable backing sheet, the photographic films or plates for black being on one backing, the photographic films or plates for yellow on another backing, and so on for the different colors desired. It is obvious that the photographic films or plates on the various backings representing the different colors should be in exact registry with each other for best results.

The photographic films or plates employed in the process are preferably positives which are made from the original camera negatives, although the invention contemplates the use of the negatives instead of the positives if desired and in the specification and claims these films or plates will be referred to as a photographic reproduction, or reproductions, which will include either positives or negative films or plates which can be used for printing upon gelatine, glue or other similar substances which have been sensitized so as to be responsive to light; what is known as pigment paper which has been sensitized being suitable, or any other prepared base may be employed.

An object of this invention is to provide a simple method and means whereby the reproductions of the various colors will be in accurate registration with each other.

A further and more specific object of the invention is to provide a layout plate with guide means whereby the backings for the photographic reproduction or reproductions may be placed in the same relative positions with respect to the layout plate while the photographic reproduction or reproductions are being mounted upon the backings whereby an accurate registration may be had.

In the accompanying drawing:

Fig. 1 is a perspective view partly in section illustrating the means which is employed for carrying out the method.

Fig. 2 is a detail of one of the backings for the photographic reproduction or reproductions showing in conventional form two reproductions placed thereon.

Fig. 3 is a view of a modified form of backing for the photographic reproduction or reproductions.

Referring to the drawing, 1 represents a supporting table of any suitable construction having an open top which is covered by a transparent or translucent plate such as a glass plate 2, this transparent or translucent plate being generally known as a layout plate and is illuminated from beneath, the means for illuminating in the present case being not shown as it is old in the art.

Upon this transparent or translucent layout plate is ruled or etched an exact layout of the size of the page of the magazine or other publication and also the position of the illustrations or any printed matter which is to be printed upon that page.

Secured to the glass layout sheet is a plurality of guides, two such guides 4 in the form of pins or pegs being shown in the present case, one on each side of the layout plate. Before these pegs or pins are fixed to the plate, they are set in the correct position by any suitable means.

The next step in the method is to place upon the layout plate a backing sheet for one set of the photographic reproduction or reproductions, this backing being represented at 5 and has apertures or holes 10 which accurately fit over the pegs or pins 4. This backing sheet is preferably a clear piece of celluloid and after it has been properly positioned on the pins, a photographic reproduction or reproductions for one of the series of colors, preferably the black color, is secured thereon, preferably by taping, in registry with the layout indications which have been etched or ruled upon the layout plate. This backing sheet with the photographic reproduction or reproductions representing one of the colors is left in position on the pegs and becomes what is called the key backing sheet.

The next step in the method is to place upon the pins 4 another clear sheet of celluloid indicated at 6, which has been accurately apertured as at 10' to receive the pins, and then secure thereon by taping, or otherwise, the photographic reproduction or reproductions representing another color, such as yellow, in exact registry with the photographic reproduction or reproductions on the key backing sheet 5, these photographic reproductions being indicated at 7 in Figs. 1 and 2.

As a next step, the backing sheet 6 with the photographic reproduction or reproductions 7 positioned thereon in exact registry with the reproduction or reproductions on the backing sheet 5 is then removed and another sheet of clear celluloid (not shown) accurately apertured is placed upon the pins 4 and the operation repeated by placing thereon a photographic reproduction or reproductions for another color, such as red, in exact registry with the photographic reproduction or reproductions on the key backing sheet 5, after which it is removed and the operation repeated for as many colors as are required.

While it has been stated that the so-called key backing 5 which is first placed upon the layout plate is usually the one with the photographic reproduction or reproductions for the color black, this is only necessary where reading matter appears upon the illustration to be printed, which reading matter is to be printed in black, and which should not appear upon the photographic reproduction or reproductions for the other colors which are placed upon the respective backing sheets. If no reading matter appears, then a backing having a photographic reproduction or reproductions for any of the colors may be used as the key backing sheet.

In Fig. 3 there is shown a modified form of backing sheet indicated at 8 which may be of some opaque material instead of a transparent celluloid sheet or backing. In this case the backing 8 is provided with an opening or openings indicated at 9 partly in full lines and partly in dotted lines, which openings allow the light from the illumination beneath the layout plate to illuminate the photographic reproduction or reproductions on the key backing sheet and permit the photographic reproduction or reproductions for the other colors to be accurately registered with those on the key backing sheet. This backing has openings 10" to secure the pins 4.

As is well known, these backing sheets having the respective photographic reproduction or reproductions representing the different colors are employed for printing upon sensitized pigment paper, or other light sensitive substance, and the process of preparing the copper cylinders or plates of the color printing press from this substance is carried out in the usual way.

Having thus described my invention, I claim:

1. The method of mounting a photographic reproduction or reproductions used in the process of preparing cylinders or plates of printing presses for color printing consisting in superimposing upon a member pervious to light and having outlines of the layout of a page or pages to be printed, a backing sheet of a character to expose the outlines of the layout member and temporarily maintaining the same in temporary fixed predetermined relation therewith, affixing to said backing a photographic reproduction or reproductions representing a given color in registry with the outlines of the layout member, and then superimposing on said backing another backing in the same temporary predetermined fixed relation with said layout member as said first backing and of a character to expose the reproduction or reproductions on said first backing, and then affixing to said second backing a photographic reproduction or reproductions representing another color in exact registry with the reproduction or reproductions on said first backing.

2. The method of mounting a photographic reproduction or reproductions used in the process of preparing cylinders or plates of printing presses for color printing consisting in placing upon a layout plate pervious to light and illuminated from beneath outlines of the desired layout, then placing upon the layout plate in temporary fixed relation therewith a backing of a character to permit the layout outlines to be seen, then securing upon said backing sheet a photographic reproduction or reproductions representing a given color of the illustration to be printed in registry with the outlines on the layout plate, then superimposing upon said backing sheet in the same temporary fixed relation therewith as that of said first backing with said layout sheet another backing sheet of a character to permit the photographic reproduction or reproductions on the first backing to be seen, then securing upon the second backing sheet a photographic reproduction or reproductions representing another color of the illustration to be printed in exact registry with the photographic reproduction or reproductions on the first backing, then removing the second backing and placing upon the first backing in the same fixed relation therewith as the second backing sheet a third backing sheet, and then securing to the third backing sheet a photographic reproduction or reproductions representing another color in exact registry with the photographic reproduction or reproductions on the first backing sheet.

3. The method of mounting a photographic reproduction or reproductions used in the process of preparing cylinders or plates of printing presses for color printing consisting in placing upon a layout plate pervious to light and illuminated from beneath outlines of the desired layout, then placing upon the layout plate in temporary fixed relation a transparent backing sheet, then placing upon said transparent backing sheet a photographic reproduction or reproductions representing a given color of the illustration to be printed in registry with the outlines on the layout plate, then superimposing upon said transparent backing sheet in the same temporary fixed relation therewith as that of said first backing sheet with said layout plate another transparent backing sheet to permit the photographic reproduction or reproductions on the first backing to be seen, then securing upon the second transparent backing sheet a photographic reproduction or reproductions representing another color of the illustration to be printed in exact registry with the photographic reproduction or reproductions on the first backing sheet.

4. The method of mounting a photographic reproduction or reproductions used in the process of preparing cylinders or plates of printing presses for color printing consisting in placing upon a layout plate pervious to light and illuminated from beneath outlines of the desired layout, then placing upon the layout plate in temporary fixed relation therewith a backing sheet having an opening or openings to permit the layout outlines to be seen, then securing upon said backing sheet over the openings photographic reproduction or reproductions representing a given color of the illustration to be printed in registry with the outlines on the layout plate, then superimposing upon said backing in temporary fixed relation therewith another backing sheet having an opening or openings to permit the photographic reproduction or reproductions on the first backing to be seen, then securing upon the second backing over the opening or openings therein a photographic reproduction or reproductions representing another color of the illustration to be printed in exact registry with the photographic reproduction or reproductions on the first backing sheet.

5. The method of mounting a photographic reproduction or reproductions used in the process of preparing cylinders or plates of printing presses for color printing consisting in placing upon a layout plate pervious to light and illuminated from beneath outlines of the desired layout, then placing upon the layout plate in temporary fixed relation therewith, a backing sheet having an opening or openings to permit the layout outlines to be seen, then securing upon said backing sheet over the opening or openings a photographic reproduction or reproductions representing a given color of the illustration to be printed in registry with the outlines on the layout plate, then superimposing upon said backing in temporary fixed relation therewith another backing having an opening or openings to permit the photographic reproduction or reproductions on the first backing sheet to be seen, then securing upon the second backing over the opening or openings therein a photographic reproduction or reproductions representing another color of the illustration to be printed in exact registry with the photographic reproduction or reproductions on the first backing sheet, then removing the second backing sheet from said first backing sheet, and then placing upon said first backing sheet another backing sheet in temporary fixed relation therewith having openings to permit the photographic reproduction or reproductions on said first backing to be seen, and then securing to said third backing sheet a photographic reproduction or reproductions in exact registry with the reproduction or reproductions on said first backing sheet.

6. Means of mounting photographic films or plates used in the process of preparing cylinders or plates of printing presses for color printing consisting of a layout plate pervious to light and having layout outlines thereon, properly positioned pins on said layout plate, a backing sheet for photographic reproduction or reproductions apertured to receive said pins and hold said backing in temporary fixed relation with said layout plate whereby photographic reproduction or reproductions may be secured to said backing sheet in registry with the layout outlines, and another backing sheet apertured to receive said pins adapted to be placed upon said first backing sheet in temporary fixed relation therewith whereby a photographic reproduction or reproductions may be secured upon said second backing sheet in registry with the photographic reproduction or reproductions on said first backing sheet.

7. Means for mounting photographic films or plates used in the process of preparing cylinders or plates of printing presses for color printing consisting, of a layout plate having layout lines thereon, said plate being pervious to light, properly positioned pins on said layout plate, a thin transparent backing sheet for a photographic reproduction or reproductions apertured to receive said pins and hold said thin backing sheet in temporary fixed relation with said layout plate whereby a photographic reproduction or reproductions may be secured to said backing sheet in registry with the layout outlines, and another thin transparent backing sheet apertured to receive said pins adapted to be placed upon said first backing sheet in temporary fixed relation therewith whereby a photographic reproduction or reproductions may be secured upon said second backing sheet in registry with the reproduction or reproductions on said first backing sheet.

EDWARD HUNTER.